May 1, 1962 E. J. H. FIALA 3,032,324
CONTROL INSTALLATION FOR VEHICLE HEATING
Filed June 23, 1959
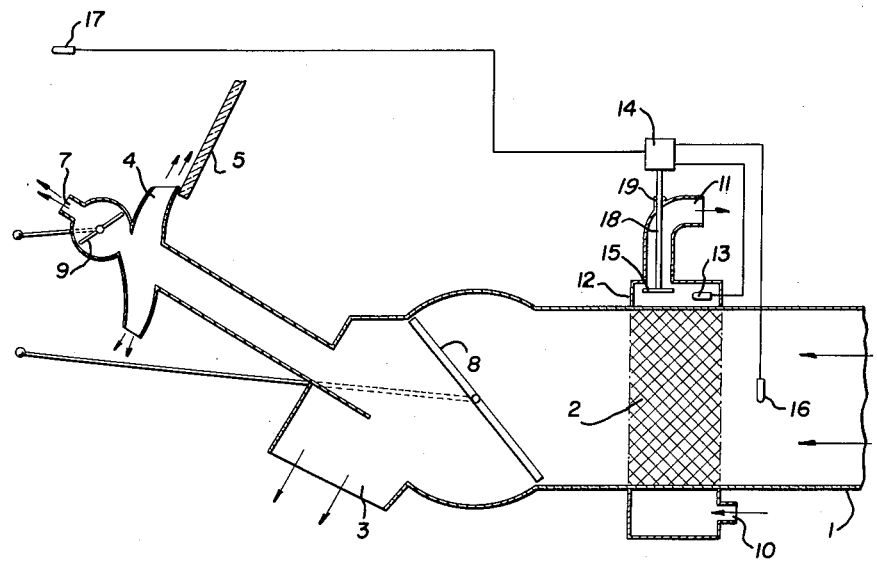
INVENTOR.
ERNST J. H. FIALA
BY
Dicke, Craig and Freudenberg
ATTORNEYS

United States Patent Office 3,032,324
Patented May 1, 1962

3,032,324
CONTROL INSTALLATION FOR VEHICLE
HEATING
Ernst J. H. Fiala, Sindelfingen, Germany, assignor to
Daimler-Benz Aktiengesellschaft, Stuttgart-Unterturkheim, Germany
Filed June 23, 1959, Ser. No. 822,222
Claims priority, application Germany June 24, 1958
2 Claims. (Cl. 257—313)

The present invention relates to a control installation for a vehicle heating system, and more particularly to a control system for the cooling-water heating installation of motor vehicles.

Motor vehicle heating installations are already known in the prior art in which the air to be heated for the vehicle interior space such as fresh air and/or recirculated air is heated by a heat exchanger through which the cooling water of the internal combustion engine flows.

Furthermore, heating installations for motor vehicles are known in the prior art in which a temperature sensing device such as a thermostat disposed within the vehicle interior space is operative to control the heating installation.

However, a disadvantage of these prior art heating installations is the relatively long time required for the responsiveness thereof, which also still exists in case the temperature sensing device is exposed to the heated air directly behind the heat exchanger.

The present invention is based on the recognition that, in addition to the quantity of air to be heated, the average temperature within the heat exchanger is also of significance for the heating of the air. Normally, this average temperature is adjusted by the selective throttling of the flow of the cooling water through the heat exchanger. However, since the rate of flow of the water depends on the engine rotational speed, the average temperature within the heat exchanger varies with each change in the rotational speed of the engine, especially when the transmission is shifted down from a higher to a lower speed thereof. A constantly changing temperature within the vehicle interior space results therefrom which requires a frequent and recurring readjustment of the temperature.

The disadvantages encountered with the prior art devices mentioned hereinabove are avoided by the present invention in that the temperature sensing device is displaced into the cooling medium flow directly behind the heat exchanger. This arrangement offers the advantage that the changes in temperature become effective instantaneously because the change of the average cooling-water temperature effects a change of the temperature of the heat exchanger and the latter again a change of the temperature of the heated air. Furthermore, the temperature change of the cooling-water at this particular place is twice as large as the change of the average temperature of the heat exchanger since the latter corresponds to the arithmetic average of the inlet and outlet tempperatures thereof. The temperature sensing device, therefore, responds more quickly because the transfer of heat between the water and the temperature sensing device is greater by a multiple factor than the heat transfer from the air to the temperature sensing device, and because a temperature change of the cooling-water precedes a temperature change of the heat exchanger.

According to a further feature in accordance with the present invention, the air temperature ahead of the heat exchanger and the intensity of the sun rays may be used additionally as adjusting magnitudes for purposes of controlling the flow of the cooling medium through the heat exchanger.

According to still another feature in accordance with the present invention, a temperature sensing device together with a throtling member for the cooling medium return flow from the heat exchanger is arranged in a water jacket located behind the heat exchanger.

Accordingly, it is an object of the present invention to provide a control system for adjusting the temperature of a motor vehicle heating installation which obviates the disadvantages of the prior art devices and which is effective, yet simple in construction and reliable in operation.

Another object of the present invention is the provision of an adjusting mechanism for the heating system of a motor vehicle heating installation which responds relatively quickly to changes in temperature.

Still another object of the present invention is the provision of such a control system for the automatic adjustment of a heating installation in motor vehicles which takes into consideration not only the changes in temperature of the cooling medium flowing through the heat exchanger at the exit thereof but also the temperature of the air to be heated prior to passage thereof through the heat exchanger as well as any other external heating effects which might influence the temperature within the vehicle interior space.

These and other objects, features and advantages of the present invention will become more obvious from the following description when taken in connection with the accompanying drawing which shows, for purposes of illustration only, one embodiment in accordance with the present invention and wherein the single figure of the drawing is a schematic cross-sectional view through a heating installation and control adjusting mechanism in accordance with the present invention with the various parts thereof illustrated schematically.

Referring now to the drawing, fresh air flows through an air scoop, preferably arranged in front of the vehicle, through the intake conduit 1 and through the heat exchanger 2 into the vehicle interior space of the vehicle body. As a rule, the prior art arrangements of the heating installations are so constructed that the warm air flows in part through an aperture 3 into the space below the dashboard in front of the feet of the passengers. Furthermore, another portion of the heated air is blown through a defroster nozzle 4 against the windshield 5 while still another portion of the heated air is blown through a blower nozzle 7 against the forwardly disposed side windows of the vehicle. The quantities of air flowing towards the various outlets may be individually and manually adjusted in any suitable manner, for example, by the manually operable control valves indicated in the drawing schematically and designated therein by reference numerals 8 and 9, respectively.

A heat exchanger 2 of any suitable construction and operatively connected with the cooling water circulatory system of the internal combustion engine serves as heater into which flows the relatively hot cooling-medium of the engine on one side thereof as at the inlet side 10 and from which the relatively cooler cooling-medium flows off again as at the outlet 11 on the other side thereof. Since such an arrangement is well known in the prior art, the details thereof are not shown herein, such system only being indicated schematically.

According to the present invention, a temperature sensing device 13 is arranged in the water jacket or chamber 12 of the heat exchanger 2 disposed along the exit side thereof which temperature sensing device 13 controls over an appropriate adjusting mechanism 14 of any suitable construction a throttling device 15 which may be, for example, in the form of a closure valve 15 and which is disposed ahead of the discharge line 11, i.e., at or near the beginning of discharge line 11. As shown in the figure, the discharge line comprises a conduit or pipe secured at one end thereof to the water jacket 12. The adjusting mechanism 14 is spaced from the discharge line 11 and the valve 15 is conected for operation by the adjusting mechanism by a stem member 18 extending through an orifice 19 in a wall of the conduit.

Additionally, the adjusting mechanism 14 may also be influenced by a temperature sensing device 16 arranged in the conduit 1 ahead of the heat exchanger 2 and by an additional temperature sensing device 17 arranged at the roof of the vehicle. The temperature sensing device 16 thereby measures the air temperature ahead of the heat exchanger 2, the temperature sensing device 13 the cooling-medium temperature directly behind the heat exchanger 2 within the water jacket or chamber 12, and the temperature sensing device 17 the sun rays impinging on the vehicle roof. The adjusting mechanism 14 is shown only diagrammatically since its features do not form the subject of the present invention and because the broad provision of an adjusting device controlled by a plurality of temperature sensing devices is old in the prior art as exemplified by Sparrow 2,805,026 and Raney 2,490,919.

Any suitable thermostats or thermo-elements may be used as temperature sensing devices. In operation, the adjusting mechanism 14 influenced by the temperature sensing devices 13, 16 and 17 determines the particular adjustment of the throttle valve 15 and therewith the rate of flow of the cooling medium through the heat exchanger in dependence on these three measuring quantities.

While I have shown one embodiment in accordance with the present invention, it is understood that the same is not limited thereto but is susceptible of many changes and modifications within the spirit and scope of the present invention and I, therefore, do not wish to be limited to the particular details shown and illustrated herein but intend to cover all such changes and modifications as are encompassed by the scope of the appended claims.

What is claimed is:

1. A control arrangement for a cooling-water motor vehicle heating installation comprising heat exchanger means having a chamber on the discharged side thereof through which said cooling water flows and having inlet and outlet means, said outlet means comprising a conduit communicating with said chamber, throttling means controlling the passage of said cooling water from said chamber to said outlet means, a temperature sensing device disposed in said chamber, said throttling means being disposed within said chamber, adjusting means for controlling said throttling means, said adjusting means being spaced from said outlet means, means connecting said throttling means and said adjusting means, means including said temperature sensing device for controlling said adjusting means, and means for passing air over said heat exchanger means, two additional temperature sensing means operatively connected with said throttling means, one of said additional temperature sensing means sensing the temperature of the air at the air intake of said heat exchanger means and the other of said additional temperature means being arranged along the upper part of the vehicle body.

2. A control arrangement for a cooling-water motor vehicle heating installation according to claim 1, wherein said throttling means includes a throttle valve disposed in said chamber, said means connecting said throttling means and said adjusting means comprising a stem member fixed to said throttle valve, an orifice in a wall of said conduit, said stem member projecting through said orifice.

References Cited in the file of this patent
UNITED STATES PATENTS

| | | |
|---|---|---|
| 1,906,994 | Modine | May 2, 1933 |
| 1,997,003 | Marquard | Apr. 9, 1935 |
| 2,355,040 | Alexander et al. | Aug. 8, 1944 |